(12) United States Patent
Park et al.

(10) Patent No.: US 9,164,171 B2
(45) Date of Patent: Oct. 20, 2015

(54) METHOD OF ULTRASONIC BEAMFORMING AND APPARATUS THEREFOR

(75) Inventors: Sung-chan Park, Suwon-si (KR);
Kyu-hong Kim, Suwon-si (KR);
Jung-ho Kim, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 943 days.

(21) Appl. No.: 13/242,880

(22) Filed: Sep. 23, 2011

(65) Prior Publication Data

US 2012/0212618 A1 Aug. 23, 2012

(30) Foreign Application Priority Data

Feb. 21, 2011 (KR) .................. 10-2011-0015223

(51) Int. Cl.
*G01S 15/89* (2006.01)
*G01S 7/52* (2006.01)

(52) U.S. Cl.
CPC ......... *G01S 15/8977* (2013.01); *G01S 7/52047* (2013.01)

(58) Field of Classification Search
CPC . G01S 15/8977; G01S 7/52049; G01S 7/523; G01S 7/534; G01S 15/89; G01S 15/8993
See application file for complete search history.

(56) References Cited

U.S. PATENT DOCUMENTS

| | | | |
|---|---|---|---|
| 5,419,330 A | 5/1995 | Nishigaki et al. | |
| 5,548,561 A * | 8/1996 | Hussain et al. | 367/7 |
| 5,575,286 A * | 11/1996 | Weng et al. | 600/444 |
| 2004/0049134 A1* | 3/2004 | Tosaya et al. | 601/2 |
| 2005/0065418 A1* | 3/2005 | Ginor | 600/345 |
| 2005/0143655 A1 | 6/2005 | Satoh | |
| 2007/0239002 A1 | 10/2007 | Alam | |
| 2009/0043201 A1* | 2/2009 | Tanigawa et al. | 600/443 |
| 2009/0080724 A1* | 3/2009 | Nanbu | 382/128 |
| 2009/0241673 A1 | 10/2009 | Kondo | |
| 2009/0306510 A1 | 12/2009 | Hashiba et al. | |

FOREIGN PATENT DOCUMENTS

| | | |
|---|---|---|
| CN | 1103774 A | 6/1995 |
| CN | 101527590 A | 9/2009 |
| JP | 08-313500 | 11/1996 |
| JP | 3711335 B2 | 11/2005 |
| JP | 2006-271557 | 10/2006 |
| JP | 2008-237789 | 10/2008 |
| JP | 2009-000393 | 1/2009 |

(Continued)

OTHER PUBLICATIONS

Synnevag et al., Adaptive Beamforming Applied to Medical Ultrasound Imaging, Aug. 2007, IEEE Transactions, vol. 40, No. 8, pp. 1-8.*

(Continued)

*Primary Examiner* — Sath V Perungavoor
*Assistant Examiner* — Peter D Le
(74) *Attorney, Agent, or Firm* — NSIP Law

(57) ABSTRACT

An ultrasonic beamforming method is provided. The ultrasonic beamforming method includes dividing an input ultrasonic signal into a plurality of regions in an observation space, calculating a weight value for each of the plurality of regions, calculating a pixel weight value for each pixel using the weight value for each region, and calculating a beamforming value using the pixel weight value.

18 Claims, 3 Drawing Sheets

(56) References Cited

FOREIGN PATENT DOCUMENTS

| | | |
|---|---|---|
| JP | 2010-029281 | 2/2010 |
| KR | 1020100006521 | 1/2010 |
| KR | 1020100053998 | 5/2010 |

OTHER PUBLICATIONS

Holfort, Iben Kraglund, et al. "Minimum variance Beamforming for High Frame-Rate Ultrasound Imaging," IEEE Ultrasonics Symposium (2007): 1541-1544.

Holfort, Iben Kraglund, et al. "Plane Wave Medical Ultrasound Imaging Using Adaptive Beamforming."0 Sensor Array and Multichannel Signal Processing Workshop, 2008. SAM 2008. 5th IEEE. IEEE, (2008): 288-292.

Asl, Babak Mohammadzadeh, et al. "Eigenspace-Based Minimum Variance Beamforming Applied to Medical Ultrasound Imaging." IEEE Transaction on Ultrasonics, Ferroelectrics and Frequency Control, vol. 57, No. 11 (2010): 2381-2390.

Extended European Search Report mailed Jun. 27, 2014 in counterpart European Application No. 12156199.7 (7 pages, in English).

Chinese Office Action issued on Sep. 25, 2014, in counterpart Chinese Application No. 201210041062.8 (14 pages in English, 11 pages in Chinese).

* cited by examiner

METHOD OF ULTRASONIC BEAMFORMING AND APPARATUS THEREFOR

CROSS-REFERENCE TO RELATED APPLICATIONS

This application claims the benefit of Korean Patent Application No. 10-2011-0015223, filed on Feb. 21, 2011, in the Korean Intellectual Property Office, the entire disclosure of which is incorporated herein by reference for all purposes.

BACKGROUND

1. Field

The following description relates to a method of ultrasonic beamforming and an apparatus therefor.

2. Description of the Related Art

An ultrasonic image is used for analyzing characteristics of tissue by outputting a pulse and receiving a reflection signal of the pulse. An ultrasonic imaging system may need focusing in order to obtain reflection characteristics of tissue located at a desired position. The ultrasonic imaging system produces data from signals input to an ultrasonic transducer during focusing, in a delay and sum (DAS) process.

It is difficult to accurately focus on tissue at a desired position due to a difference in the signal speed between neighboring tissues or refraction and reflection effects. To address the matter, adaptive weight beamforming technology has been suggested in which the DAS process is performed by giving a weight to a signal input to each element of the ultrasonic transducer. The adaptive weight beamforming technology having a weight controlling effect may minimize signal noise so that a variation value is reduced. According to an application of the adaptive weight beamforming technology, a higher resolution image may be obtained in comparison to an application of the DAS method. However, the application of the adaptive weight beamforming technology may increase an amount of calculation in comparison to the application of the DAS method.

SUMMARY

According to an aspect, an ultrasonic beamforming method is provided. The ultrasonic beamforming method includes dividing an input ultrasonic signal into a plurality of regions in an observation space, calculating a weight value for each of the plurality of regions, calculating a pixel weight value for each pixel using the weight value for each region, and calculating a beamforming value using the pixel weight value.

The dividing of the input ultrasonic signal into a plurality of regions may include dividing the ultrasonic signal into a plurality of blocks that do not overlap each other.

The dividing of the input ultrasonic signal into a plurality of regions may include dividing the ultrasonic signal into a plurality of blocks that partially overlap each other.

The calculating of a weight value for each of the plurality of regions may include calculating a pixel covariance value with respect to each of all pixels in an ultrasonic image, calculating a region covariance value by summing pixel covariance values for all pixels included in a corresponding region with respect to each of the plurality of regions, and calculating a weight value for each region using the region covariance values with respect to the plurality of regions.

The calculating of a weight value for each region using the region covariance values with respect to the plurality of regions may include calculating a region weight value for each block by an equation that in response to a region covariance value and a steering vector being given.

The calculating a pixel weight value for each pixel using the weight value for each region may include calculating the pixel weight value by linearly interpolating the weight values for the plurality of regions.

The ultrasonic beamforming method may further include generating an image based on the beamforming value.

The ultrasonic beamforming method may further include displaying the generated image.

The calculating of the beamforming value is based on an adjusted weight value.

In another aspect, an ultrasonic beamforming apparatus is provided. The ultrasonic beamforming apparatus includes an input unit configured to receive an ultrasonic signal, a region weight calculation unit configured to divide the ultrasonic signal into a plurality of regions in an observation space and calculate a weight value for each of the plurality of regions, a pixel weight calculation unit configured to calculate a pixel weight value for each pixel using the weight value for each region, and a beamforming unit configured to calculate a beamforming value using the pixel weight value and generate an ultrasonic image using the calculated beamforming value.

The region weight calculation unit may divide the ultrasonic signal into a plurality of blocks that do not overlap each other.

The region weight calculation unit may divide the ultrasonic signal into a plurality of blocks that partially overlap each other.

The region weight calculation unit may calculate a pixel covariance value with respect to each of all pixels in an ultrasonic image, may calculate a region covariance value by summing pixel covariance values for all pixels included in a corresponding region with respect to each of the plurality of regions, and may calculate a weight value for each region using the region covariance values with respect to the plurality of regions.

The region weight calculation unit may calculate a region weight value for each block by an equation that in response to a region covariance value and a steering vector being given.

The pixel weight calculation unit may calculate the pixel weight value by linearly interpolating the weight values for the plurality of region.

In another aspect, an ultrasonic imaging system is provided. The ultrasonic imaging system includes an input unit configured to receive an ultrasonic signal, a region weight calculation unit configured to divide the ultrasonic signal into a plurality of regions in an observation space and calculate a weight value for each of the plurality of regions, a pixel weight calculation unit configured to calculate a pixel weight value for each pixel using the weight value for each region, a beamforming unit configured to calculate a beamforming value using the pixel weight value and generating an ultrasonic image using the calculated beamforming value, and a display unit configured to display the generated ultrasonic image.

A non-transitory computer readable recording medium having recorded thereon a program for executing an ultrasonic beamforming method is provided. The ultrasonic beamforming method includes dividing an input ultrasonic signal into a plurality of regions in an observation space, calculating a weight value for each of the plurality of regions, calculating a pixel weight value for each pixel using the weight value for each region, and calculating a beamforming value using the pixel weight value.

Other features and aspects may be apparent from the following detailed description, the drawings, and the claims.

Figure 1:
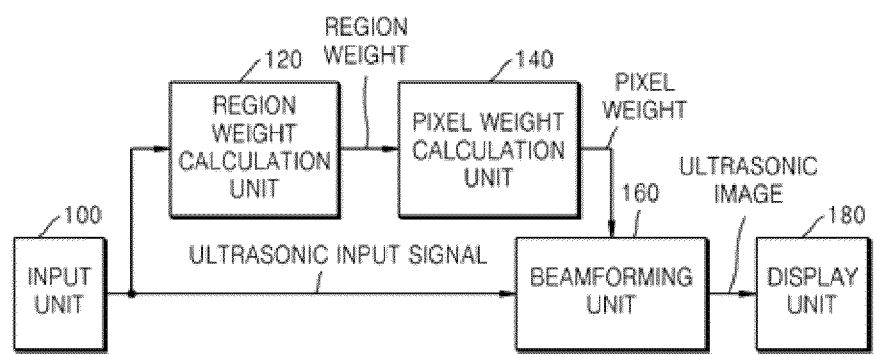
FIG. 1 is a diagram illustrating an example of an ultrasonic imaging system.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following detailed description is provided to assist the reader in gaining a comprehensive understanding of the methods, apparatuses, and/or systems described herein. Accordingly, various changes, modifications, and equivalents of the systems, apparatuses and/or methods described herein will be suggested to those of ordinary skill in the art. Also, descriptions of well-known functions and constructions may be omitted for increased clarity and conciseness.

According to an aspect, the following description relates to high-speed beamforming technology that calculates a weight value based on a region.

Figure 3:
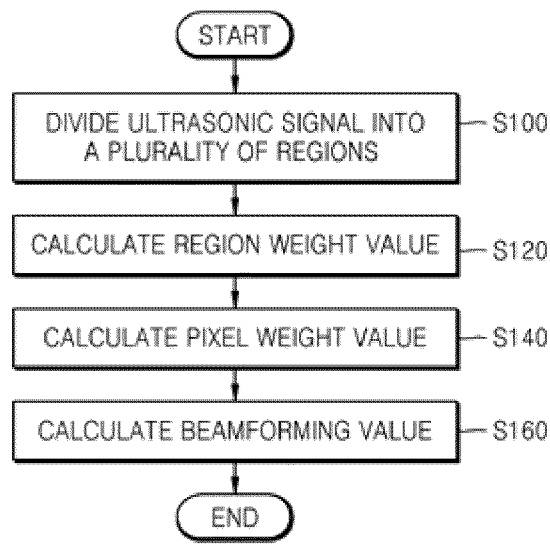
FIG. 3 is a flowchart illustrating an example of an ultrasonic beamforming method.
Figure 4:
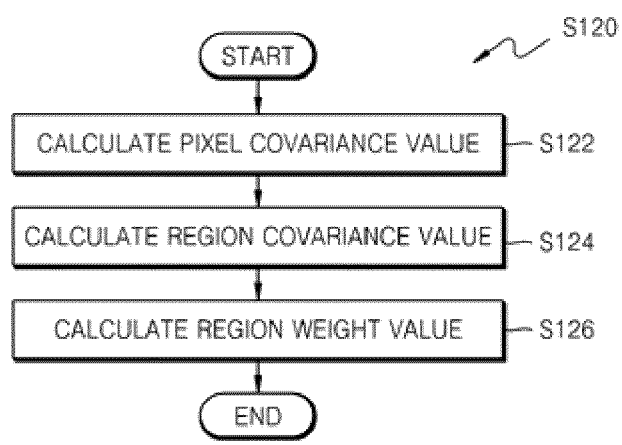
FIG. 4 is a flowchart illustrating an example of an operation of calculating a region weight value.

FIG. 1 is a diagram illustrating an example of an ultrasonic imaging system. FIG. 3 is a flowchart of an example of an ultrasonic beamforming method. FIG. 4 is a flowchart of an example of an operation of calculating a region weight value.

Referring to FIG. 1, the example of the ultrasonic imaging system includes an input unit 100, a region weight calculation unit 120, a pixel weight calculation unit 140, a beamforming unit 160, and a display unit 180. The input unit 100 receives an ultrasonic signal.

The region weight calculation unit 120 divides an input ultrasonic signal into a plurality of regions in an observation space (S100) and calculates a region weight value for each divided region (S120). In other words, the region weight calculation unit 120 is a module for calculating a parameter for each observation region based on an input signal. As an example, the region weight calculation unit 120 calculates a pixel covariance value with respect to each of the pixels in an ultrasonic image (S122), calculates a region covariance value for each of the regions by summing pixel covariance values of all of the pixels in the corresponding region (S124), and calculates a region weight value for each region by using the region covariance values of the regions (S126).

The pixel weight calculation unit 140 calculates a pixel weight value for each pixel by using the region weight values (S140). As an example, the pixel weight calculation unit 140 calculates a pixel weight value by interpolating the region weight values.

As such, a pixel weight value may be calculated for each pixel, not based on directly calculating a weight value, but based on dividing an input ultrasonic signal into a plurality of regions, calculating a region weight value for each region, and calculating a pixel weight value based on the region weight value.

Figure 2A:
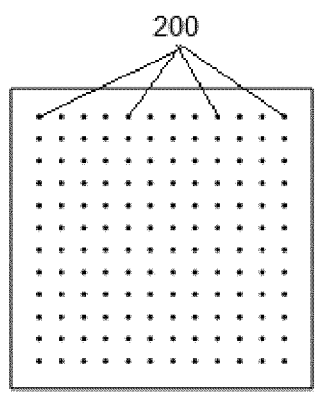
FIGS. 2A and 2B illustrate examples of calculating a weight value in units of pixels and of calculating a weight value in units of regions.
Figure 2B:
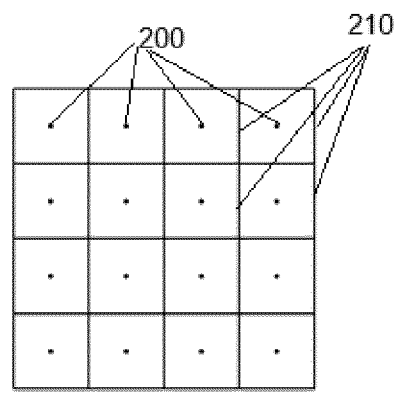

FIGS. 2A and 2B illustrate examples of calculating a weight value in units of pixels 200 and of calculating a weight value in units of regions 210. FIG. 2A illustrates an example of calculating a weight value in units of pixels 200. In this example, an amount of calculation increases.

As illustrated in FIG. 2B, the ultrasonic signal in an observation space is divided into a plurality of regions 210, a representative weight value needed for DAS is calculated for each region 210, and a weight of each pixel 200 is calculated based on a region weight. An ultrasonic signal may be divided into a plurality of blocks that do not overlap each other, as illustrated in the example of FIG. 2B, or as another example, a plurality of blocks that partially overlap each other. As yet another example, the ultrasonic signal may be divided into a plurality of regions 210 with each region having a shape different from a block.

The beamforming unit 160 calculates a beamforming value by applying DAS using a pixel weight value (S160) and generates an ultrasonic image using a calculated beamforming value. The display unit 180 displays (outputs) a generated ultrasonic image. The beamforming process will be described using mathematical expressions based on an example of dividing an ultrasonic signal into a plurality of blocks that do not overlap each other, as illustrated in FIG. 2B.

In response to an index of each block being (i, j) and an index of each pixel being (x, y), a case with a covariance matrix for each pixel $\hat{R}(x, y)$, a region covariance matrix for each block $\overline{R}(j,i)$, a region weight value for each block $\overline{w}(i, j)$, a steering vector $$a = \begin{pmatrix} 1 \\ \vdots \\ 1 \end{pmatrix},$$

and a pixel weight value $w(x, y)$, is taken into consideration. An ultrasonic signal is input to the input unit 100 and is divided into N×M blocks by the region weight calculation unit 120 as illustrated in FIG. 2B.

The region weight calculation unit 120 calculates an average or summed covariance matrix based on a data value input for each block. In other words, the covariance matrix for each pixel $\hat{R}(x, y)$ is calculated (S122) and the region covariance matrix for each block $\overline{R}(j,i)$ is calculated by obtaining a sum with respect to a block at a position (j, i) and having a size of M×N by using the covariance matrix for each pixel $\hat{R}(x, y)$ (S124).

In response to the calculation being performed in an image coordinate system, the following equation is obtained.

$$\overline{R}(j, i) = \sum_{m=-M/2}^{M/2} \sum_{n=-N/2}^{N/2} \hat{R}_k(Mj + m, Ni + n) \quad \text{[Equation 1]}$$

Also, in response to a plurality of sub-apertures being set in the number less than that of entire elements of a transducer, summation of covariance values of the plurality of sub-apertures may be obtained. In response to a sub-aperture index being K, $\overline{R}(j,i)$ is expressed as follows.

$$\overline{R}(j, i) = \sum_{m=-M/2}^{M/2} \sum_{k=-K/2}^{K/2} \hat{R}_k(Mj + m, Ni) \quad \text{[Equation 2]}$$

As another aspect, the region weight calculation unit 120 calculates a region weight value for each block according to the following equation.

$$\overline{W}(j, i) = \frac{\overline{R}(j, i)^{-1} a}{a^H \overline{R}(j, i)^{-1} a} \quad \text{[Equation 3]}$$

According to Equation 3, to calculate a weight value, an inverse matrix of the covariance R is calculated. In response to a weight value being calculated for each pixel, $\hat{R}(x, y)$ is used instead of $\overline{R}(j,i)$ in Equation 3.

Assuming that a transducer includes P-number of elements, the calculation of the inverse matrix has a complexity of $O(P^3)$ with respect to a P×P matrix. As another aspect, in response to the calculation of the inverse matrix being performed with respect to an N×M block, the amount of calculation may be reduced by 1/MN times.

The pixel weight calculation unit 140 calculates a pixel weight value for each pixel (x, y) using bilinear interpolation, which is expressed by the following equation.

$$w(x,y) = \text{interpolation}(\overline{w}(i,j)) \quad \text{[Equation 4]}$$

The beamforming unit 160 calculates a minimum variance (MV) beamforming value using an adaptive weight value, and then generates ultrasonic image data based on the calculated beamforming value and outputs the generated data to the display unit 180.

The interpolation calculation of a weight value and the calculation needed for performing DAS have a complexity of O(P). Thus, a portion having the largest amount of calculation in the overall calculation may be the calculation portion of the weight value.

Accordingly, in the following description, in a weight calculation part that has the highest complexity, the complexity is reduced by calculating a weight for each divided region instead of calculating a weight for each pixel. For example, in response to an observation space for ultrasonic signal being divided into blocks of a 4×32 size, the amount of calculation may be reduced by 1/128 times as a whole.

Figure 5A:
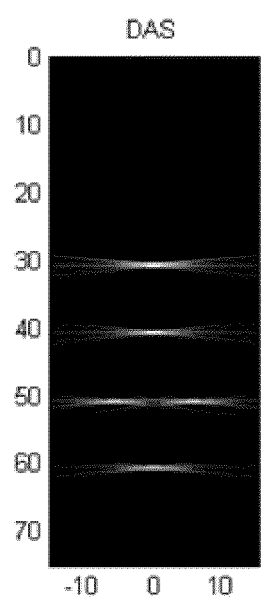
FIGS. 5A, 5B, and 5C illustrate results of tests obtained by applying the examples.
Figure 5B:
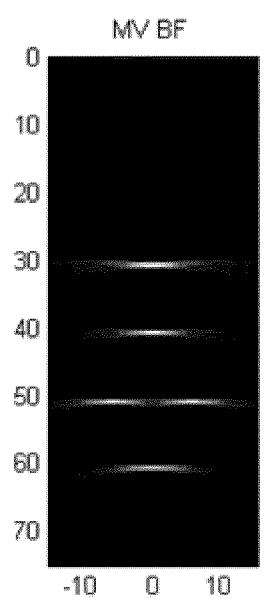
Figure 5C:
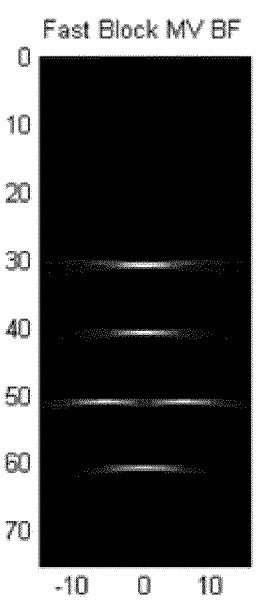

FIGS. 5A, 5B, and 5C illustrate results of tests obtained by applying the examples. FIG. 5A illustrates an example of a DAS, FIG. 5B illustrates an example of MV beamforming in response to a weight for each pixel being calculated, and FIG. 5C illustrate an example of MV beamforming in response to a weight for each region being calculated and a weight for each pixel being calculated by interpolating the calculated weight for each region.

In each image, a horizontal axis refers to an angle and a vertical axis refers to an axial distance. Comparing the image of FIG. 5C with that of FIG. 5A, it may be seen that a resolution of an image of FIG. 5C is improved with respect to the image of FIG. 5A. Also, comparing the image of FIG. 5C with that of FIG. 5B, it may be seen that, while the amount of calculation is reduced, there is little difference in resolution between the images of FIGS. 5B and 5C. As such, in response to the beamforming method being adopted, the amount of calculation is decreased and substantially the same image quality as that in a method of calculating a weight for each pixel may be obtained.

The description is merely one example and a variety of examples may be possible in calculating a weight by dividing an entire image into a plurality of regions. Although the shape of a region or a degree of overlapping between regions may vary, a remarkable decrease in the amount of calculation may be possible.

An example of calculating a weight by dividing an entire image into a plurality of regions may include a method of calculating a weight for each region based on a lookup table (LUT), Capon beamforming, Mean Square Error beamforming, Minimum Variance beamforming, Generalized Sidelobe Canceller, Broad band beamforming, and the like.

According to the ultrasonic image beamforming technology, resolution and contrast may be improved by analyzing input image data. Since a weight for each region is calculated and then a weight for each data is calculated based on the calculated weight for each region, a high quality image may be obtained at high speed. The subject technology may be applied to various ultrasonic imaging technologies such as, for example, ultrasonic imaging, elastic image, radar signal processing or sound signal processing.

An example of a medical device including the ultrasonic beamforming technology is an ultrasonography.

Program instructions to perform a method described herein, or one or more operations thereof, may be recorded, stored, or fixed in one or more computer-readable storage media. The program instructions may be implemented by a computer. For example, the computer may cause a processor to execute the program instructions. The media may include, alone or in combination with the program instructions, data files, data structures, and the like. Examples of computer-readable media include magnetic media, such as hard disks, floppy disks, and magnetic tape; optical media such as CD ROM disks and DVDs; magneto-optical media, such as optical disks; and hardware devices that are specially configured to store and perform program instructions, such as read-only memory (ROM), random access memory (RAM), flash memory, and the like. Examples of program instructions include machine code, such as produced by a compiler, and files containing higher level code that may be executed by the computer using an interpreter. The program instructions, that is, software, may be distributed over network coupled computer systems so that the software is stored and executed in a distributed fashion. For example, the software and data may be stored by one or more computer readable recording mediums. Also, functional programs, codes, and code segments for accomplishing the example embodiments disclosed herein can be easily construed by programmers skilled in the art to which the embodiments pertain based on and using the flow diagrams and block diagrams of the figures and their corresponding descriptions as provided herein. Also, the described unit to perform an operation or a method may be hardware, software, or some combination of hardware and software. For example, the unit may be a software package running on a computer or the computer on which that software is running.

A number of examples have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. An ultrasonic beamforming method, comprising:
   dividing an input ultrasonic signal into regions in an observation space;
   calculating a weight value for each of the regions;
   calculating a pixel weight value for each pixel that is disposed in an interior of one of the regions using the weight value for each region; and
   calculating a beamforming value using the pixel weight value, wherein the calculating a pixel weight value for each pixel using the weight value for each region comprises calculating the pixel weight value by linearly interpolating the weight values for the regions.

2. The ultrasonic beamforming method of claim 1, wherein the dividing of the input ultrasonic signal into the regions comprises dividing the ultrasonic signal into blocks that do not overlap each other.

3. The ultrasonic beamforming method of claim 1, wherein the dividing of the input ultrasonic signal into the regions comprises dividing the ultrasonic signal into blocks that partially overlap each other.

4. The ultrasonic beamforming method of claim 1, wherein the calculating of a weight value for each of the regions comprises:
   calculating a pixel covariance value with respect to each of all pixels in an ultrasonic image;
   calculating a region covariance value by summing pixel covariance values for all pixels included in a corresponding region with respect to each of the regions; and
   calculating a weight value for each region using the region covariance values with respect to the regions.

5. The ultrasonic beamforming method of claim 4, wherein the calculating of a weight value for each region using the region covariance values with respect to the regions comprises calculating a region weight value for each block $\overline{w}(i, j)$ by an equation $$\overline{W}(j, i) = \frac{\overline{R}(j, i)^{-1} a}{a^H \overline{R}(j, i)^{-1} a},$$

in response to a region covariance value $\overline{R}(j,i)$ and a steering vector $$a = \begin{pmatrix} 1 \\ \vdots \\ 1 \end{pmatrix}$$

being given.

6. An ultrasonic beamforming apparatus, comprising:
   an input processor configured to receive an ultrasonic signal;
   a region weight calculation processor configured to divide the ultrasonic signal into regions in an observation space and calculate a weight value for each of the regions;
   a pixel weight calculation processor configured to calculate a pixel weight value for each pixel that is disposed in an interior of one of the regions using the weight value for each region; and
   a beamforming processor configured to calculate a beamforming value using the pixel weight value and generate an ultrasonic image using the calculated beamforming value, wherein the pixel weight calculation processor is configured to calculate the pixel weight value by linearly interpolating the weight values for the regions.

7. The ultrasonic beamforming apparatus of claim 6, wherein the region weight calculation processor is configured to divide the ultrasonic signal into blocks that do not overlap each other.

8. The ultrasonic beamforming apparatus of claim 6, wherein the region weight calculation processor is configured to divide the ultrasonic signal into blocks that partially overlap each other.

9. The ultrasonic beamforming apparatus of claim 6, wherein the region weight calculation processor is configured to
   calculate a pixel covariance value with respect to each of all pixels in an ultrasonic image,
   calculate a region covariance value by summing pixel covariance values for all pixels included in a corresponding region with respect to each of the regions, and
   calculate a weight value for each region using the region covariance values with respect to the regions.

10. The ultrasonic beamforming apparatus of claim 9, wherein the region weight calculation processor is configured to calculate
    a region weight value for each block $\overline{w}(i, j)$ by an equation that $$\overline{W}(j, i) = \frac{\overline{R}(j, i)^{-1} a}{a^H \overline{R}(j, i)^{-1} a}$$

in response to a region covariance value $\overline{R}(j, i)$ and a steering vector $$a = \begin{pmatrix} 1 \\ \vdots \\ 1 \end{pmatrix}$$

being given.

11. An ultrasonic imaging system, comprising:
    an input processor configured to receive an ultrasonic signal;
    a region weight calculation processor configured to divide the ultrasonic signal into in an observation space and calculate a weight value for each of the regions;
    a pixel weight calculation processor configured to calculate a pixel weight value for each pixel that is disposed in an interior of one of the regions using the weight value for each region;
    a beamforming processor configured to calculate a beamforming value using the pixel weight value and generating an ultrasonic image using the calculated beamforming value; and
    a display processor configured to display the generated ultrasonic image, wherein the pixel weight calculation processor is configured to calculate the pixel weight value by linearly interpolating the weight values for the regions.

12. A non-transitory computer readable recording medium having recorded thereon a program for executing an ultrasonic beamforming method, the ultrasonic beamforming method comprising:
    dividing an input ultrasonic signal into regions in an observation space;
    calculating a weight value for each of the regions;

calculating a pixel weight value for each pixel that is disposed in an interior of one of the regions using the weight value for each region; and calculating a beamforming value using the pixel weight value, wherein the calculating a pixel weight value for each pixel using the weight value for each region comprises calculating the pixel weight value by linearly interpolating the weight values for the regions.

13. The ultrasonic beamforming method of claim 1, further comprising generating an image based on the beamforming value.

14. The ultrasonic beamforming method of claim 13, further comprising displaying the generated image.

15. The ultrasonic beamforming method of claim 1, wherein the calculating of the beamforming value is based on an adjusted weight value.

16. The ultrasonic beamforming apparatus of claim 6, wherein the region weight calculation processor is configured to calculate an average covariance matrix based on a data value input for each of the regions.

17. The ultrasonic beamforming apparatus of claim 6, comprising a lookup table to calculate a weight for each region.

18. The ultrasonic beamforming apparatus of claim 6, wherein in response to a number of sub-apertures being set to less than a number of elements of a transducer, the region weight calculation processor is configured to sum the covariance values of the sub-apertures.

* * * * *